US010648602B2

(12) United States Patent
Quesada

(10) Patent No.: US 10,648,602 B2
(45) Date of Patent: May 12, 2020

(54) SEALING GASKET WITH SPECIALIZED REINFORCING RING FOR SEALING PLASTIC PIPELINES

(71) Applicant: S&B Technical Products, Inc., Fort Worth, TX (US)

(72) Inventor: Guido Quesada, Santa Ana (CR)

(73) Assignee: S&B Technical Products, Inc, Fort Worth, TX (US)

( * ) Notice: Subject to any disclaimer, the term of this patent is extended or adjusted under 35 U.S.C. 154(b) by 51 days.

(21) Appl. No.: 15/975,847

(22) Filed: May 10, 2018

(65) Prior Publication Data

US 2018/0340642 A1 Nov. 29, 2018

Related U.S. Application Data

(60) Provisional application No. 62/510,088, filed on May 23, 2017.

(51) Int. Cl.
| | |
|---|---|
| *F16L 47/08* | (2006.01) |
| *F16L 37/084* | (2006.01) |
| *F16L 17/025* | (2006.01) |
| *B29C 45/14* | (2006.01) |
| *B29L 31/26* | (2006.01) |

(Continued)

(52) U.S. Cl.
CPC ........ *F16L 47/08* (2013.01); *B29C 45/14819* (2013.01); *F16L 17/025* (2013.01); *F16L 37/0845* (2013.01); *B29C 45/1459* (2013.01); *B29K 2021/006* (2013.01); *B29K 2701/12* (2013.01); *B29L 2031/26* (2013.01)

(58) Field of Classification Search
CPC ....... F16L 21/03; F16L 37/0845; F16L 47/08; F16L 47/12; F16L 47/121; F16J 15/122; F16J 15/166
See application file for complete search history.

(56) References Cited

U.S. PATENT DOCUMENTS

| | | |
|---|---|---|
| 4,625,383 A | 12/1986 | Vassallo et al. |
| 4,693,483 A | 9/1987 | Valls |
| 4,818,209 A | 4/1989 | Petersson et al. |

(Continued)

OTHER PUBLICATIONS

Trelleborg, Forsheda 601, Power-Lock™, 2 pages, Jan. 2011, Trelleborg Pipe Seals Lelystad B.V.; www.Trelleborg.com/pipeseals.

(Continued)

*Primary Examiner* — Nicholas L Foster
(74) *Attorney, Agent, or Firm* — Whitaker Chalk Swindle & Schwartz PLLC; Charles D. Gunter, Jr.

(57) ABSTRACT

A pipe sealing gasket is shown which is designed to be received within a raceway provided within a socket end of a female bell plastic pipe end which is assembled with a mating male pipe end to form a plastic pipe joint. The raceway in the female bell plastic pipe end is preformed during manufacture and the gasket is installed thereafter. The gasket has a rubber body portion which is reinforced by a hard plastic band formed as a series of integral, spaced wedges which are interconnected by a flexible ribbon. The gasket is flexible enough to be flexed and placed in the pipe raceway and yet the hard plastic band acts to prevent extrusion of the gasket during a variety of pressure conditions as well as preventing displacement during field assembly.

7 Claims, 15 Drawing Sheets

(51) Int. Cl.
*B29K 21/00* (2006.01)
*B29K 701/12* (2006.01)

(56) References Cited

U.S. PATENT DOCUMENTS

| | | | |
|---|---|---|---|
| 4,834,398 A | 5/1989 | Guzowski et al. | |
| 4,834,430 A | 5/1989 | Vassalo et al. | |
| D330,073 S * | 10/1992 | Valls | D23/269 |
| 5,213,339 A | 5/1993 | Walworth | |
| 5,334,458 A | 8/1994 | Powers et al. | |
| 5,360,218 A | 11/1994 | Percebois et al. | |
| 5,988,695 A | 11/1999 | Corbett, Jr. | |
| 6,113,159 A | 9/2000 | Corbett, Jr. | |
| 6,142,484 A | 11/2000 | Valls, Jr. | |
| 6,152,494 A | 11/2000 | Corbett, Sr. et al. | |
| 6,299,176 B1 | 10/2001 | Guzowski et al. | |
| 6,328,309 B1 | 12/2001 | Corbett, Jr. | |
| 6,676,886 B2 | 1/2004 | Corbett, Jr. | |
| 6,945,570 B2 | 9/2005 | Jones | |
| 7,410,174 B2 * | 8/2008 | Jones | F16L 21/08 277/615 |
| 7,731,884 B2 | 6/2010 | Knapp et al. | |
| 7,774,915 B2 * | 8/2010 | Darce | F16L 21/03 29/428 |
| 7,815,225 B2 * | 10/2010 | Jones | F16L 37/0845 285/339 |
| 7,837,239 B2 | 11/2010 | Krausz et al. | |
| 8,074,996 B2 | 12/2011 | Darce et al. | |
| 8,622,399 B2 * | 1/2014 | Monteil | F16L 21/03 277/616 |
| 9,593,787 B2 * | 3/2017 | Monteil | F16J 15/104 |
| 9,951,869 B2 * | 4/2018 | Lopez-Chaves | F16J 15/022 |
| 10,107,427 B2 * | 10/2018 | Monteil | F16L 17/035 |
| 10,288,199 B2 * | 5/2019 | Copeland | F16L 37/08 |
| 10,393,296 B2 * | 8/2019 | Quesada | F16J 15/121 |
| 2006/0175776 A1 | 8/2006 | Happel | |
| 2006/0279080 A1 | 12/2006 | Jones et al. | |
| 2008/0007062 A1 | 1/2008 | Jones et al. | |
| 2008/0284166 A1 * | 11/2008 | Darce | F16L 21/03 285/337 |
| 2010/0059940 A1 * | 3/2010 | Monteil | F16L 21/03 277/314 |
| 2012/0049463 A1 | 3/2012 | Holmes, IV et al. | |
| 2013/0001821 A1 * | 1/2013 | Monteil | F16L 21/03 264/101 |
| 2014/0374995 A1 | 12/2014 | Monteil et al. | |
| 2016/0223109 A1 * | 8/2016 | Lopez-Chaves | F16J 15/022 |
| 2017/0328503 A1 * | 11/2017 | Copeland | F16L 37/08 |
| 2017/0370505 A1 * | 12/2017 | Copeland | F16L 37/0845 |
| 2018/0031157 A1 * | 2/2018 | Copeland | F16L 37/08 |
| 2018/0094754 A1 | 4/2018 | Quesada | |
| 2018/0340642 A1 * | 11/2018 | Quesada | B29C 45/1459 |

OTHER PUBLICATIONS

Trelleborg, Forsheda 576, Anger-Lock™, 2 pages, Jan. 2011, Trelleborg Pipe Seals Lelystad B.V.; www.Trelleborg.com/pipeseals.
PCT/US2018/32724 International Search Report; Int'l Filing Date May 15, 2018; 2 pages; dated Aug. 7, 2018.

* cited by examiner

SEALING GASKET WITH SPECIALIZED REINFORCING RING FOR SEALING PLASTIC PIPELINES

CROSS REFERENCE TO RELATED APPLICATIONS

The present application claims priority from a previously filed provisional application, Ser. No. 62/510,088, filed May 23, 2017, entitled "Sealing Gasket with Specialized Reinforcing Ring for Sealing Plastic Pipelines," by the same inventor. The present application is also related to previously filed Ser. No. 15/092,174, filed Apr. 6, 2016, by inventor Guillermo Monteil, and entitled "Secured In Place Gasket For Sealing Plastic Pipelines, Method of Manufacture and Method of Installation Thereof, presently pending.

BACKGROUND OF THE INVENTION

Field of the Invention

The present invention relates generally to sealing gaskets and sealing systems used for pipe joints in plastic pipelines in which a male spigot pipe section is installed within a mating female socket pipe section to form a pipe joint and, more specifically, to an improved gasket having a specialized reinforcing ring, as well as an installation method for installing a locked-in gasket within a preformed gasket groove in a section of pipe used to form a pipe joint.

Description of the Prior Art

Fluid sealing systems fir plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed using a collapsible mandrel belling tool at the pipe manufacturing facility. A prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring with a stiffening band which was inserted into a mating groove provided on the internal diameter of the rubber ring. Each of these solutions had critical limitations. For example, the prior art plastic/rubber composites sometimes allowed the infiltration of dirt and debris between the bell raceway and the outer diameter of the gasket. The plastic region in some cases, reduced the rubber surface contact area, sometimes leading to problems in providing the needed sealing in all conditions, including high pressure, low pressure and cyclic surges. Compatible materials were necessary when bonding the homogeneous rubber gasket body with the plastic reinforcing band. Poor bonding resulted in separation of the two elements. The reinforcing band was subject to being misplaced and breakage in the two part system. Thus, in some cases, the prior art solutions failed to provide the needed joint integrity, often contributing to the complexity and expense of the manufacturing operation and field installation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal groove in the socket end of the female pipe as the female or belled end was simultaneously being formed. Rather than utilizing a preformed groove, the Rieber process provided a prestressed and anchored elastomeric gasket during the belling operation. Because the gasket was installed simultaneously with the formation of the belied pipe end, a rigid, embedded reinforcing ring could be supplied as a part of the gasket Because the pipe groove was, in a sense, formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others U.S. Pat. Nos. 4,120,521; 4,061,459; 4,030,872; 3,965,715; 3,929,958; 3,887,992; 3,884,612; and 3,776,682.

Despite the advances offered by the Rieber process, belling operation was somewhat complicated and costly. Also, certain situations exist which it would be desirable to manually remove one gasket and reinstall another within a preformed raceway in the selected pipe end, rather than utilizing an integrally installed gasket in which the groove in the pipe is formed around the gasket. For example, municipal and consulting engineers will specify specialty elastomers based on the pipelines end-we and soil conditions. While SBR is the most common rubber used in North America, engineers will specify EPDM based on water treatment technique, and nitrile rubber when there is hydrocarbon soil contamination due to gasoline or oil pollution. Distributors and contractors cannot exchange Rieber process gaskets in their pipe inventory. It would therefore be advantageous to be able to install a gasket of the type having a reinforcing element within a previously belled pipe end, as opposed to those systems like the Rieber systems, where the female pipe end is formed about the sealing gasket during the manufacture of the female pipe end. However, prior art gaskets with reinforcing elements are subject to breakage and are not easily bent or flexed by hand, thus generally precluding hand assembly in the field. The size and position of the reinforcing element, which is bonded to the gasket body, generally was greater than the diameter of the mouth opening of the belled pipe end, presenting a further complication for assembly.

U.S. Pat. No. 6,044,539, issued Apr. 4, 2000, to Gutowski, and commonly owned by the present applicant describes a machine for inserting a "snap-fit" gasket, unable to accept inverse curvature, having an embedded reinforcing ring into a preformed gasket receiving groove in a belled pipe end. However, such a machine was fairly costly to construct and presented difficulties in being hand carried by a worker in the field.

The present invention has, as one object, to provide an improved pipe gasket for use in pipe joints which offers the advantage of a Rieber type seal, while allowing the gasket to accept inverse curvature, to be installed in a preformed groove by hand, either at the manufacturing plant or in a field operation or to replace a previously installed Rieber gasket which has been removed post-manufacture.

Another object of the invention is to provide an improved gasket which is securely retained within a preformed pipe groove without the necessity of a separate retaining band.

Another object of the invention is to provide an improved sealing gasket of the plastic/rubber variety which optimizes the rubber sealing surface contact of the gasket with the pipe bell raceway.

Another object of the invention is to provide a specialized reinforcing ring that is not required to be bonded to the rubber element, hence creating the possibility of being made from a multitude of materials.

Another object of the invention is to provide such a sealing gasket with special reinforcing attributes which allow it to seal under a variety of pressure conditions without being twisted or extruded, or displaced during field assembly, and yet which can be installed by hand in the bell raceway.

SUMMARY OF THE INVENTION

The sealing gasket of the invention is a rubber/plastic secured-in design which is especially useful in sealing PVC pipes having bell ends made using collapsible mandrel tools. The gasket is reinforced with a reinforcing band, or ring, comprised of a series of wedges which are interconnected by a flexible ribbon. The band is preferably embedded within the rubber body portion of the gasket, during the molding operation, avoiding the use of bonding elements. The rubber element of the gasket provides the primary sealing capacity while the plastic element improves resistance to extrusion due to water pressure and displacement during field assembly.

The gasket accepts inverse curvature to allow easy installation in a pre-formed pipe bell raceway by hand. Once the gasket is installed, it works as a combined compression and lip seal. It can conveniently be installed by the PVC pipe manufacturer and, once installed, is a secured part of the pipe. The rubber portion of the gasket can be, for example, SBR, EPDM, NR, etc., combined with a hard plastic band.

In its preferred form, a pipe sealing gasket is shown which is designed for receipt within a raceway provided within a female bell socket end of a thermoplastic pipe, the raceway being generally arcuate with a forward facing slope region when viewed in cross section. The raceway has been previously formed during the manufacture of the pipe and the gasket is installed thereafter. The female bell socket end of the pipe has a given internal diameter which is being designed to receive a mating male thermoplastic pipe end to form a pipe joint. The mating male thermoplastic pipe end also has a given outer diameter.

The preferred gasket of the invention includes a ring shaped elastomeric body having a main body portion formed of rubber which, when viewed in cross section, includes a leading nose region, a lower compression region and a trailing tail region, the leading nose region facing generally towards the female socket end of the pipe once the gasket is inserted within the pipe. A leading nose region of the main body portion of the gasket is reinforced by a hard plastic band formed as a series of integral, spaced wedges interconnected by a flexible ribbon. The hard plastic band is embedded within the leading nose region of the main body portion of the gasket during gasket manufacture.

The hard plastic band is formed of a synthetic plastic material having a durometer which is greater than the durometer of the main body portion of the gasket while being flexible enough to allow the gasket to accept inverse curvature during installation into the groove provided in the female, socket end of the thermoplastic pipe. The main body portion of the gasket can be formed of a natural or synthetic rubber. For example, the main body portion of the gasket can be formed of a rubber selected from the group consisting of styrene butadiene rubber, ethylene propylene diene monomer rubber and nitrite rubber. The synthetic plastic material can be an "engineered plastic", such as, for example, a modified polyphenylene ether.

The wedges on the hard plastic band act in concert with the forward facing slope region of the arcuate raceway to wedge between the outer diameter of the male thermoplastic pipe end and the internal diameter of the female bell socket end in use. The embedded hard plastic band acts to prevent extrusion of the gasket from the groove provided in the female bell socket end of the thermoplastic pipe once a spigot end of a mating male pipe is installed to form a pipe joint and the pipe is pressurized.

The spaced wedges of the hard plastic band each have a front edge, a rear edge and opposing side edges, as viewed in cross section, and wherein the opposing side edges slope evenly in the direction of the leading nose region of the gasket. The front edges of the wedges are covered by a layer of rubber during the molding process so that they are encapsulated within the rubber.

In one version of the gasket of the invention, the hard plastic band is formed as a continuous ring with an inner sidewall and an outer sidewall, and wherein the rear edges of each of the integral, spaced wedges sit flush at one circumferential position on the inner sidewall of the continuous ring.

In another version of the gasket of the invention, the hard plastic band is positioned approximately half in back of each wedge and half in the middle region of each wedge.

In yet another version of the sealing gasket of the invention, the hard plastic band is positioned slightly behind the middle region of each wedge, and wherein the wedges on the hard plastic band each have a hollow region therein.

In one particularly preferred form of the sealing gasket of the invention, the lower compression region of the gasket includes a series of circumferential engagement grooves for engaging the mating male spigot pipe end. The main gasket body can also be provided with an outer bulbous region which is also provided with a series of circumferential engagement grooves for engaging the female socket end of the pipe.

In one preferred version, the main gasket body has a lower, primary sealing surface which thrills a combination lip and compression seal region for the gasket. The "lip" region is separated from the convex sealing surface and trailing tail portion of the gasket body by a V-shaped recess. The V-shaped recess allows the lip region of the gasket body to bend inwardly as the mating male, spigot end of a mating pipe section encounters the primary sealing surface of the gasket.

The gasket of the invention, while being reinforced by the hard plastic ribbon, is nevertheless flexible enough to allow the ribbon to be bent at an oblique angle for insertion within the mating bell groove provided in the female socket pipe end. The gasket then returns to a generally cylindrical shape and is secured-in within the bell socket groove by the action of the hard plastic ribbon.

Additional objects, features and advantages will be apparent in the written description which follows.

DETAILED DESCRIPTION OF THE INVENTION

Figure 1:
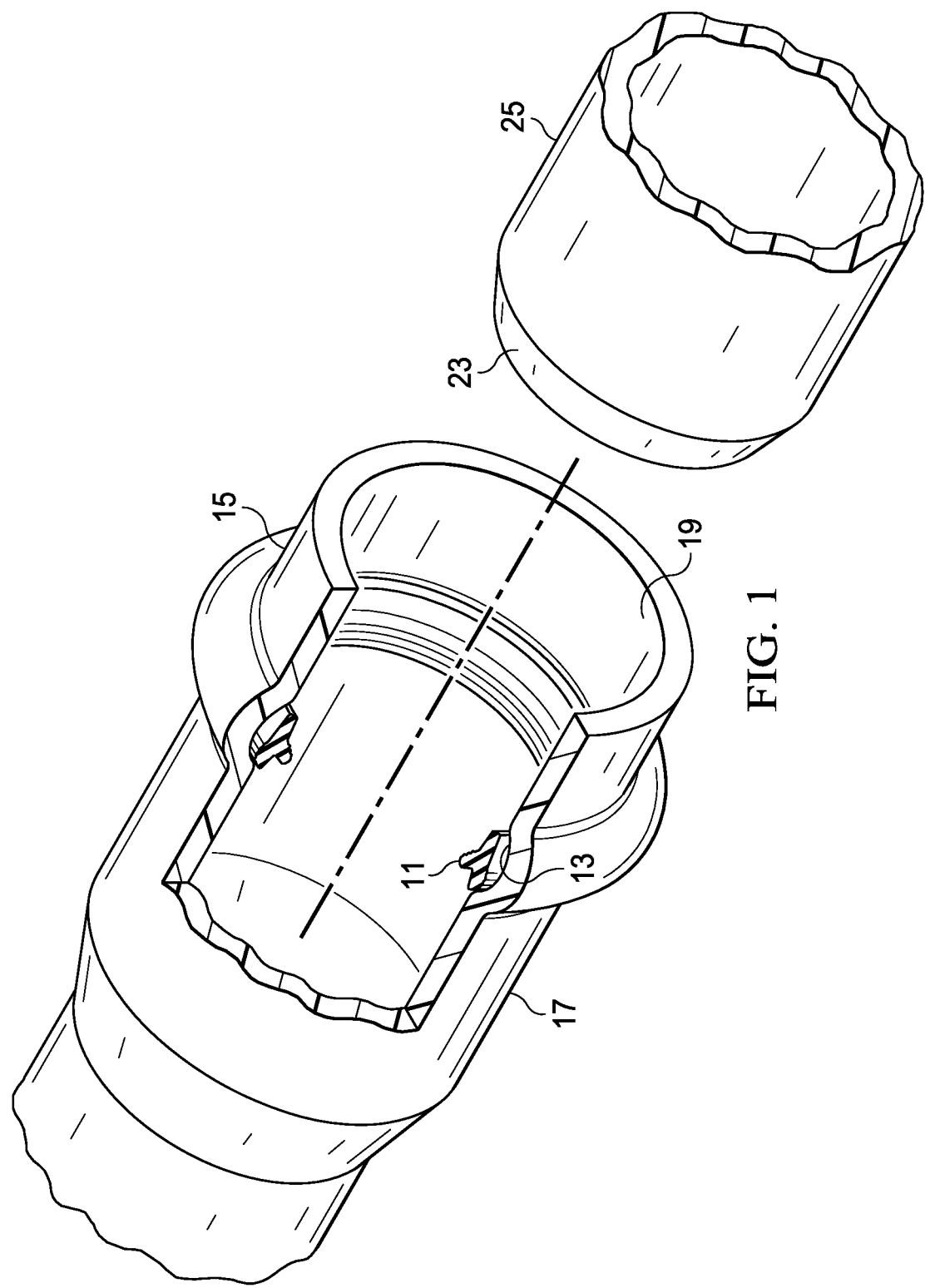
FIG. 1 is an end view of a section of plastic pipe, partly broken away, and showing the bell end and raceway, with an earlier version of the gasket of the invention in place in the raceway, the male pipe section being position for insertion into the bell.

Turning now to the attached illustrations, FIG. 1 shows an earlier version of the gasket of the invention, designated as 11, in place prior to the assembly of a pipe joint. The gasket 11 is installed within a raceway 13 provided within the belled end 15 of a female pipe section of thermoplastic pipe 17. The female pipe section 17 can be formed of any of a variety of commercially available thermoplastic materials, such as the polyolefin family including polyethylene and polypropylene as well as polyvinyl chloride and similar materials. Thermoplastic pipes of this general type are used in a variety of industrial settings including water, sewage and chemical industries. The belled end 15 of the thermoplastic pipe section has a mouth opening 19 which is engageable with a spigot end 23 of a mating male pipe section 25 to form a pipe joint. The gasket receiving raceway 13 has been pre-formed in the pipe month opening 19 at the pipe manufacturing facility, as by using a collapsible mandrel belling tool. The raceway 13 is generally arcuate as viewed in cross section with a forwardly facing slope region (32 in FIG. 7).

Figure 2:
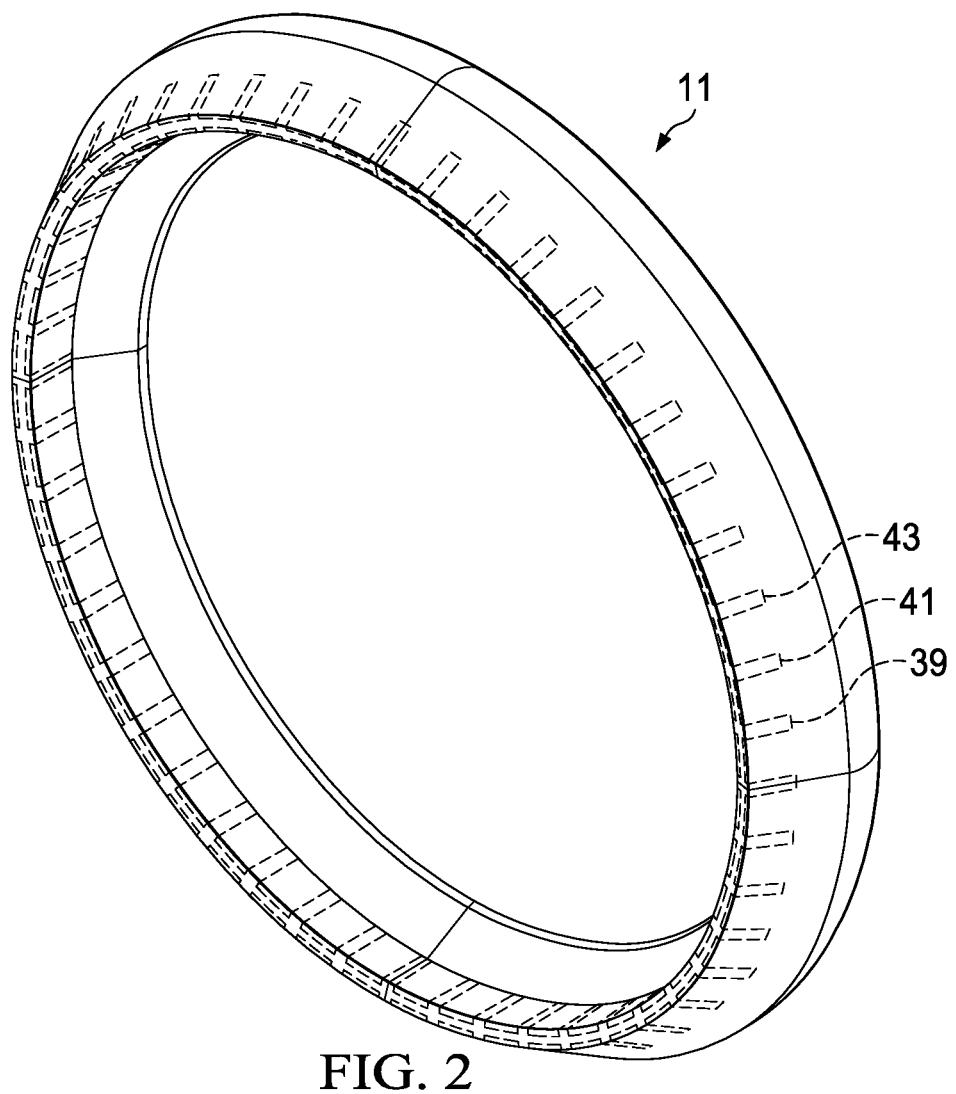
FIG. 2 is a perspective view of the sealing gasket of FIG. 1, showing an early version of the hard plastic band with its wedges and associated flexible ribbon in dotted lines.
Figure 7:
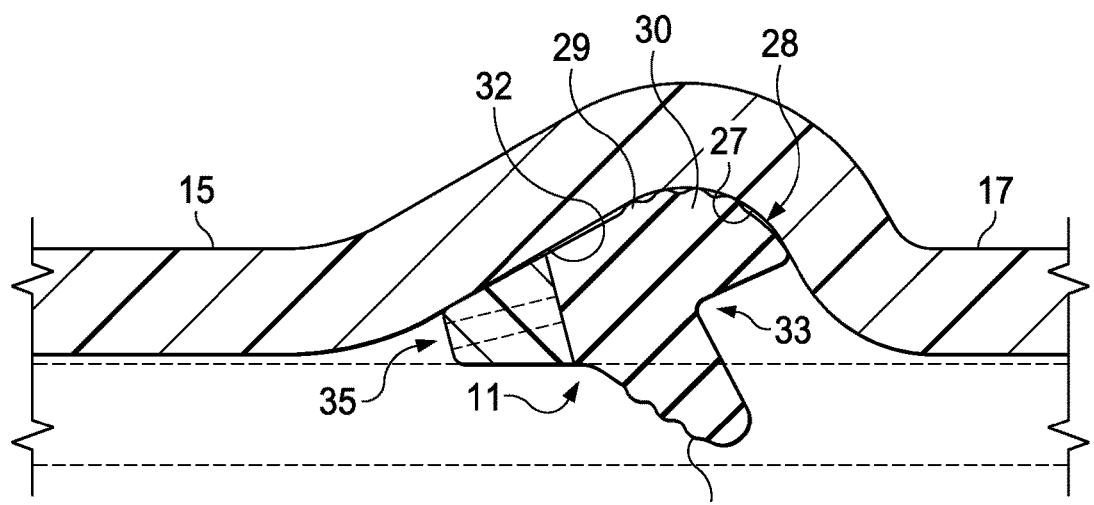
FIG. 7 is a side, partial cross sectional view of one version of the gasket of the invention in place in the internal groove provided in the female bell socket pipe end, the direction of travel of the mating male pipe member being shown in dotted lines.

The earlier version of the gasket of FIG. 1 is shown in profile in FIG. 2 and in cross-section in FIG. 7. Preferably, the gasket 13 is an annular, ring-shaped member having a main gasket body 28 formed of a flexible elastomeric material, such as a suitable natural or synthetic rubber. The elastomeric material used to form the body 28 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrile rubber, etc.

Turning now to FIG. 7, the main gasket body 28 includes an outer convex sealing surface 27 which, in this case, is provided with a series of ribs or serrations 29. The main gasket body also includes a lower, primary sealing surface 31. In the preferred embodiment shown, the primary sealing surface 31 is an evenly sloping face of the gasket body which forms a combination lip and compression seal region for the gasket. The lip region is separated from the outer convex sealing surface 27 and trailing tail portion 30 by a V-shaped recess (shown generally as 33 in FIG. 7). The V-shaped recess allows the lip region of the gasket body to bend inwardly as the mating male, spigot end of a mating pipe section encounters the primary sealing surface 31 of the gasket (see FIGS. 10-12).

Returning to FIG. 7, the main gasket body 28 also has a leading nose region, designated generally as 35 in FIG. 7 which is initially contacted by the mating male spigot pipe end during the assembly of the pipe joint. The leading nose region 35 faces generally towards the female socket end of the pipe once the gasket is inserted within the pipe.

Figure 8:
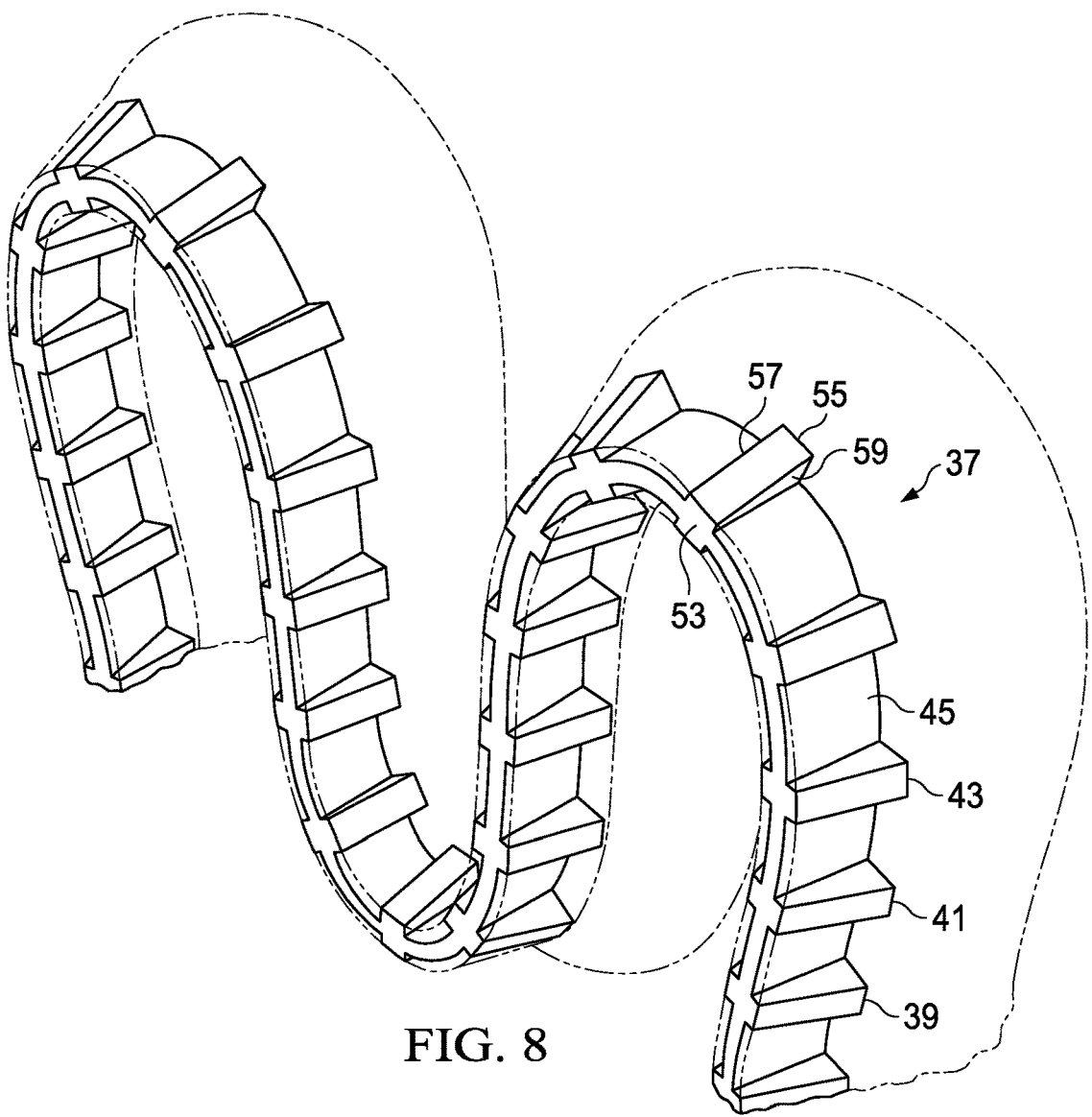
FIG. 8 is a broken away view of an earlier version of the hard plastic band used in the manufacture of the gasket of FIG. 7, and illustrating the wedges which are interconnected by the flexible ribbon and the position of the ribbon relative to the spaced wedges.

With reference now to FIG. 8, it will be appreciated that the leading nose region of the gasket is reinforced by a hard plastic band 37 formed as a series of integral, spaced wedges (such as wedges 39, 41, 43) interconnected by a flexible ribbon 45. As will be apparent from FIGS. 4 and 8, the wedges 39 each have a front edge 53, a rear edge 55 and opposing side edges 57, 59. The opposing aide edges (such as side edge 59 in FIG. 10) slope evenly from the rear edges 55 to the front edges 53 thereof, as viewed in this cross section. FIG. 2 shows the reinforcing hard plastic band with its associated wedges in phantom lines (see, e.g., wedges 39, 41, 43). The gasket body can thus be thought of as having a rubber element and as having a hard plastic element, the hard plastic element serving as the reinforcing element for the gasket body.

During the manufacture of the gasket, the hard plastic band 37 is embedded within the leading nose region of the gasket during the gasket manufacturing operation. As will be explained in greater detail, the wedges 39 on the hard plastic band 37 act to prevent extrusion of the gasket from the raceway (13 in FIG. 1) provided in the female socket end of the thermoplastic pipe once a spigot end of a mating male pipe is installed to form a pipe joint.

The hard plastic band shown in isolated fashion in FIG. 8 of the drawings is an earlier version of the plastic band which posed certain problems during manufacture, primarily with respect to the injection molding operation. The present invention is directed primarily to improvements in the shape and function of the hard plastic band. The improved versions of the band are shown in FIGS. 13-22 of the drawings. The primary areas of improvement concern the placement of the band or ribbon with respect to the individual spaced wedges that are interconnected by the flexible band, and also the use of hollow wedge segments, and these differences will be discussed in detail in the written description which follows.

As was previously mentioned, the main body portion of the gasket is formed of a natural or synthetic rubber, such as a styrene butadiene rubber, ethylene propylene diene monomer rubber or nitrile rubber. The durometer of the rubber used for the main gasket body may vary depending on the end application but will typically be in the range from about 40-70 Shore A hardness, preferably about 40-60 Shore A. The hard plastic band 37, on the other hand, is formed of a synthetic plastic material having a durometer which is greater than the durometer of the main body portion of the gasket. The synthetic plastic material used for the band is preferably a material which shows an appropriate stiffness for the application at hand while allowing flexing (accepts inverse curvature) during installation. The band can have a higher durometer than the remaining main body portion of the gasket since it does not participate in the sealing function of the gasket to the same extent as the primary sealing region of the gasket.

Various hard plastic type materials may be suitable candidates for use as the hard plastic band. These materials include such materials as polypropylene, polyvinylchloride and various "engineered plastics." For example, one such material is those hard plastics which fall into the family group of modified polyphenylene ethers (PPE). These commercially available materials have high heat resistance, making them suitable for injection or compression molding and are generally suitable for plastic/rubber composites. One commercially available family is the VESTORAN® family of materials. VESTORAN® is the registered trademark of Evonik Degussa GmbH for molding compounds containing poly-2,6-dimethyl-1,4-phenylene ether as polymeric constituent (poly-phenylene ether, PPE, also referred to as PPO).

Figure 3:
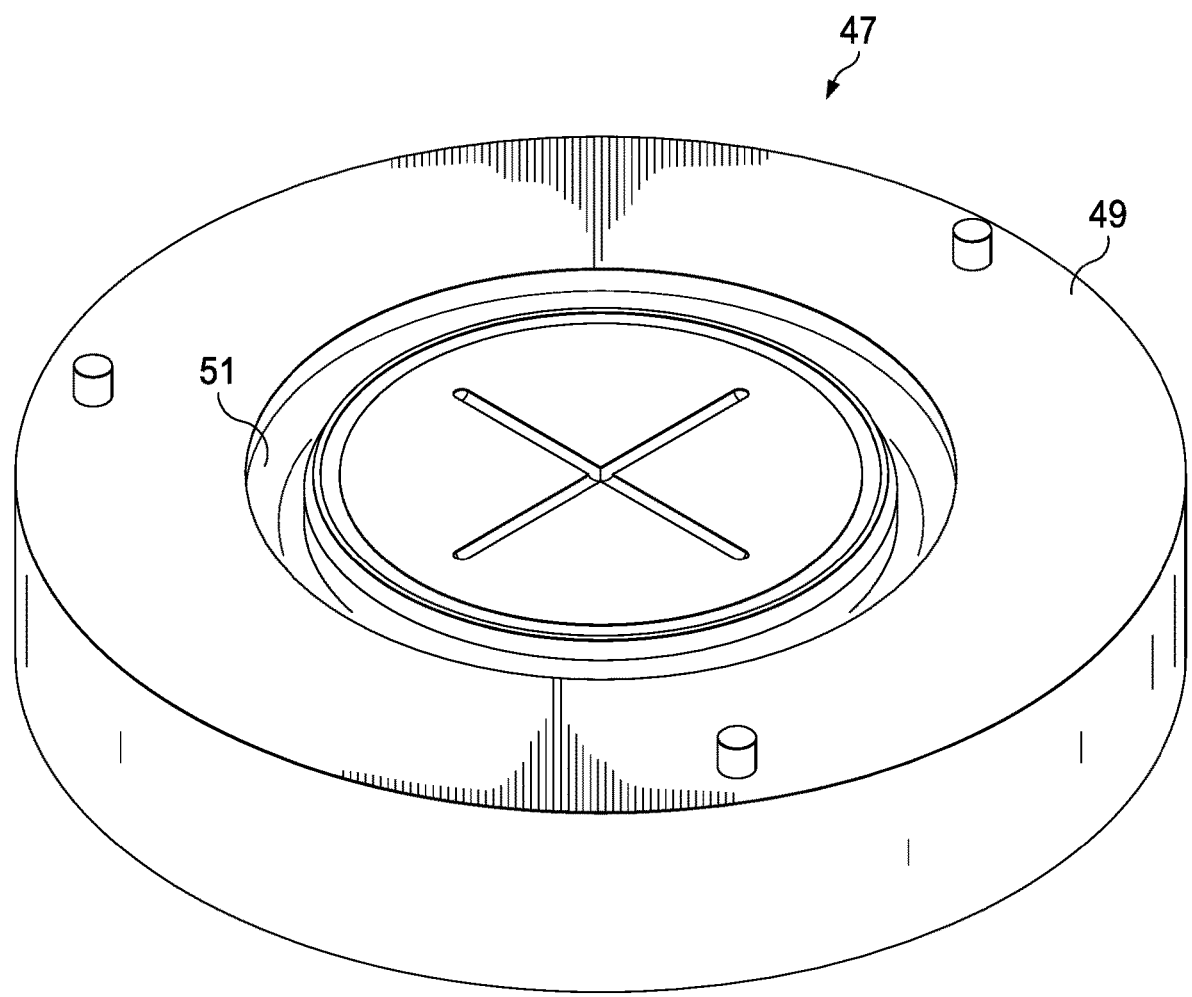
FIGS. 3-6 are simplified views of the steps of installing the hard plastic band within an associated mold, the mold thereafter being injected with rubber and heated and cured to make the completed gasket of the invention.
Figure 4:
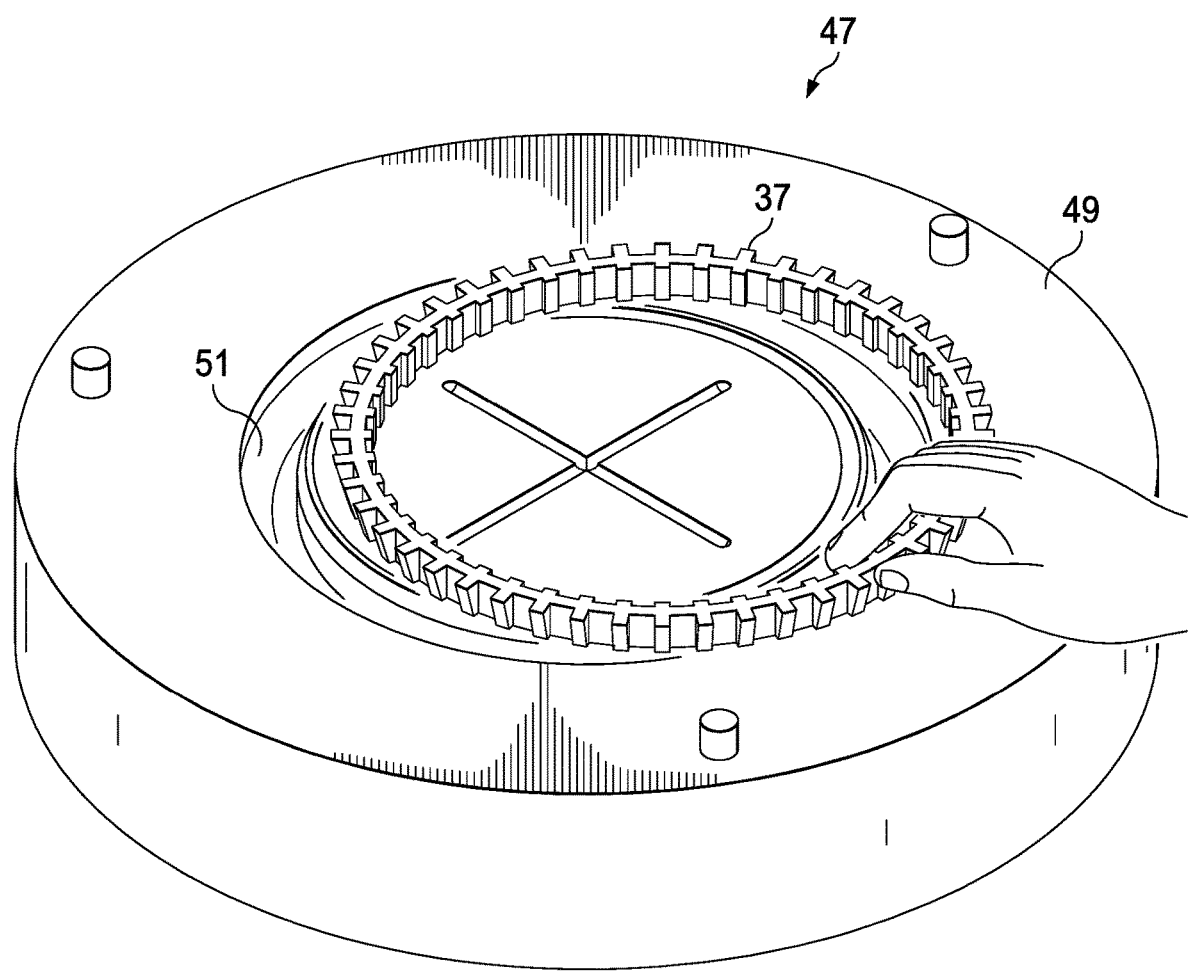

The method of manufacturing the sealing pipe gasket of the invention will now be described. The gasket is designed for receipt within a bell pipe raceway provided within, a socket end of a female bell pipe member, whereby fitting the gasket within the raceway allows a mating male pipe having a spigot pipe end to be inserted therein to form a continuous pipe joint. The manufacturing method will be described primarily with respect to FIGS. 3-6. FIG. 3 shows one half of an injection molding die 47 of the type that will be familiar to those skilled, in the relevant arts. As can be seen in FIG. 3, the first mold half has a first mold face 49 with a circumferential recess 51. As shown in FIG. 4, in the first step of the manufacturing process, the hard plastic band 37 with its series of integral, spaced wedges interconnected by the flexible ribbon 45 is placed within the circumferential recess 51. It will be appreciated that placing the wedges into the mold as discrete and individual elements would be very time consuming. However, because the teeth are interconnected by the flexible ribbon, they can easily be placed in the mold integrally, in a single step. This also assures the proper spacing of the individual teeth about the circumference of the gasket.

Figure 5:
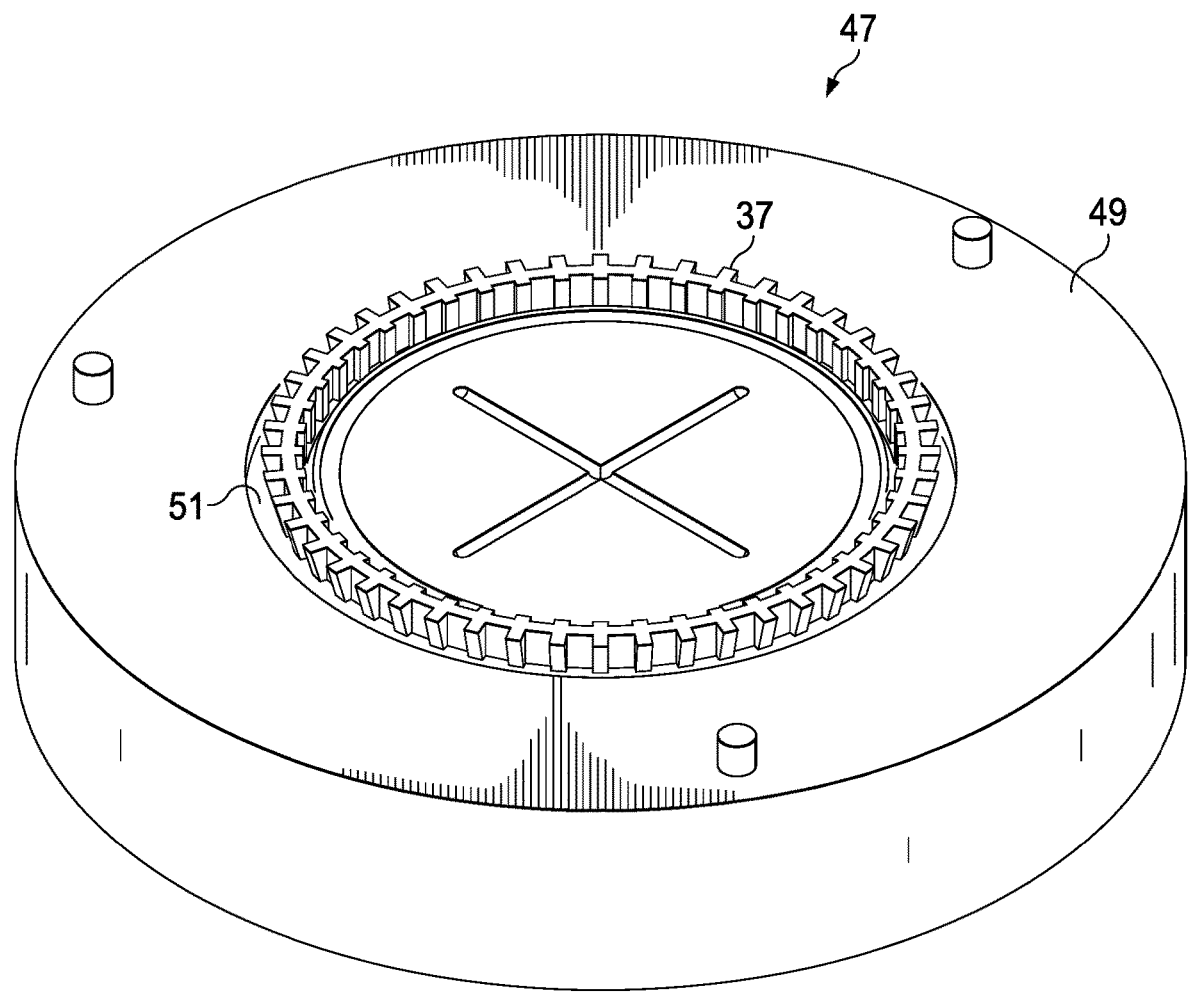
Figure 6:
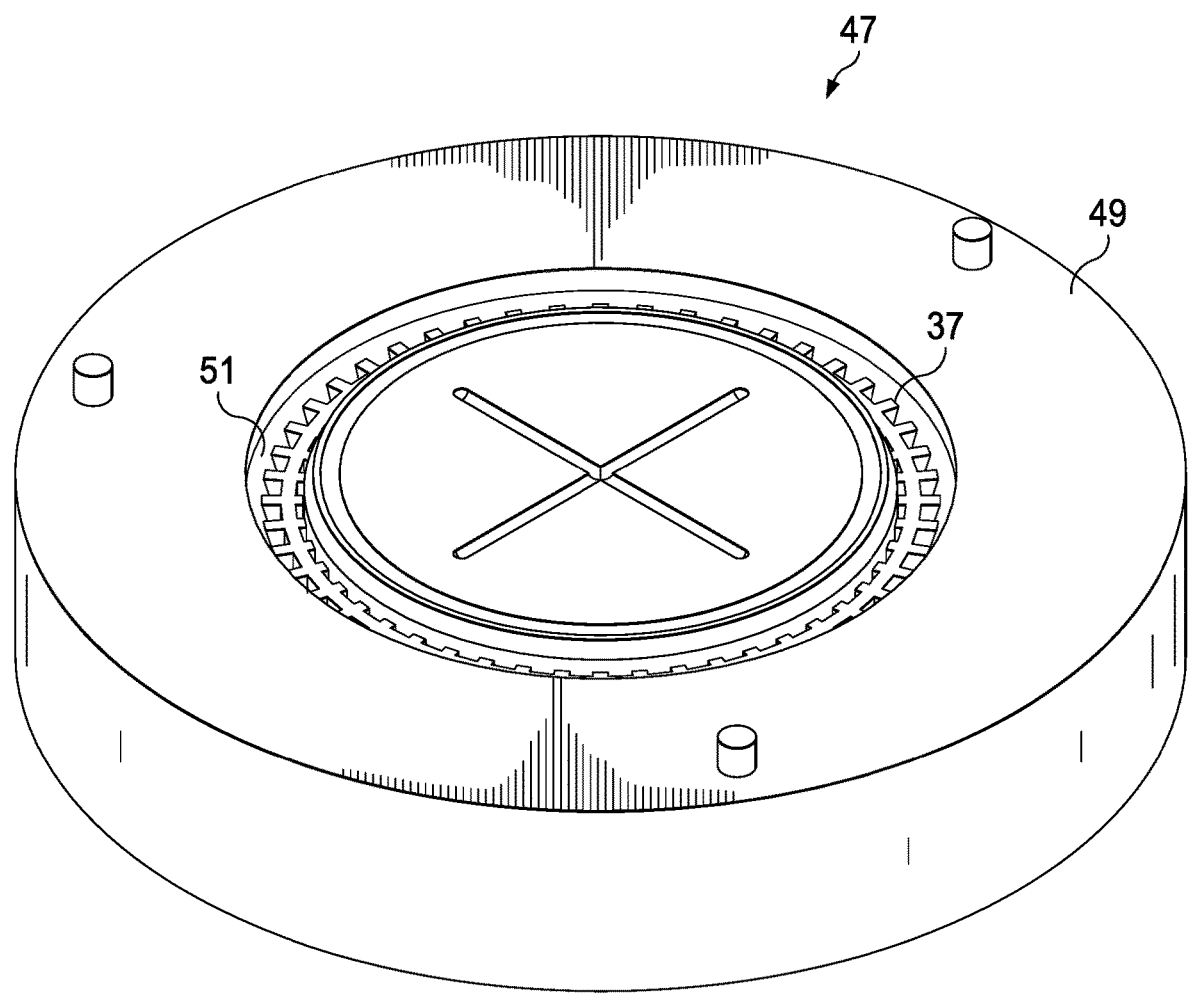

Next, there is provided a second mating mold face which is essentially a mirror image of the first mold face. FIG. 5 shows the hard plastic band partially installed in the circumferential groove of the first mold face, while FIG. 6 shows the band fully installed. The first and second mold faces are then united and the moldable rubber compound is injected into the circumferential recess. In the known manner, heat and pressure are then applied to the mold to form a ring shaped elastomeric body. The heat and pressure in the mold cures the main body portion with the hard plastic band embedded therein, whereby the main body portion of the gasket is reinforced by the hard plastic band, whereby hydraulic pressure due to fluid in the pipe acts upon the wedges on the hard plastic band to push the teeth into tighter engagement with the mating male and female pipe members to prevent extrusion of the gasket from the raceway provided in the female bell socket end of the thermoplastic pipe once a spigot end of a mating male pipe is installed to form a pipe joint and the pipe is conveying fluid.

Figure 11:
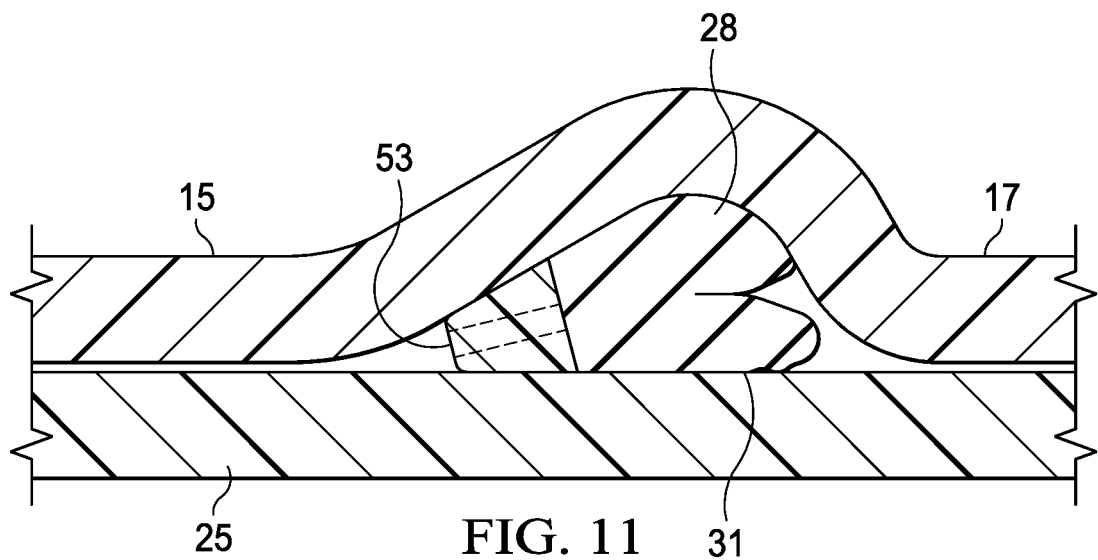
FIG. 11 is a view similar to FIG. 10, showing a completed pipe joint with an external pressure force acting on the sealing gasket.
Figure 12:
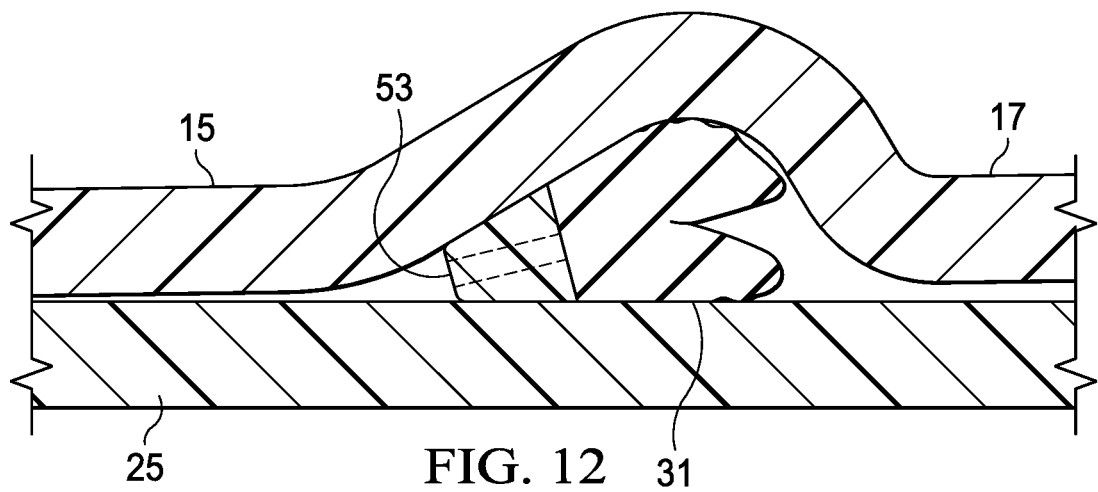
FIG. 12 is another view of the completed pipe joint, this time with the sealing gasket having an internal pressure force acting on the gasket.

While the gasket body is reinforced to prevent extrusion under various fluid pressure conditions, as well as from being displaced during field assembly, it remains flexible enough to allow the gasket to be bent by hand and installed within a gasket receiving raceway provided within the belled end of a female pipe member. The sealing gasket can be installed within the gasket receiving raceway by bending the gasket to temporarily transform the gasket from a generally cylindrical shape to a generally elliptical shape, followed by placing the gasket within the gasket receiving groove and releasing the gasket, whereby the gasket returns to the generally cylindrical shape. Hydraulic pressure due to fluid in the pipe acts upon the wedges on the hard plastic band to push the wedges into tighter engagement with the mating male and female pipe members to prevent extrusion of the gasket from the raceway provided in the female bell socket end of the thermoplastic pipe once a spigot end of a mating male pipe is installed to form a pipe joint and the pipe is conveying fluid. FIG. 11 shows a cross section of the gasket of FIG. 7 installed in a pipe joint with external pressure acting upon the gasket. FIG. 12 is a view similar to FIG. 11 but shows the cross sectional shape of the gasket where an internal fluid pressure is acting upon the gasket body.

Figure 10:
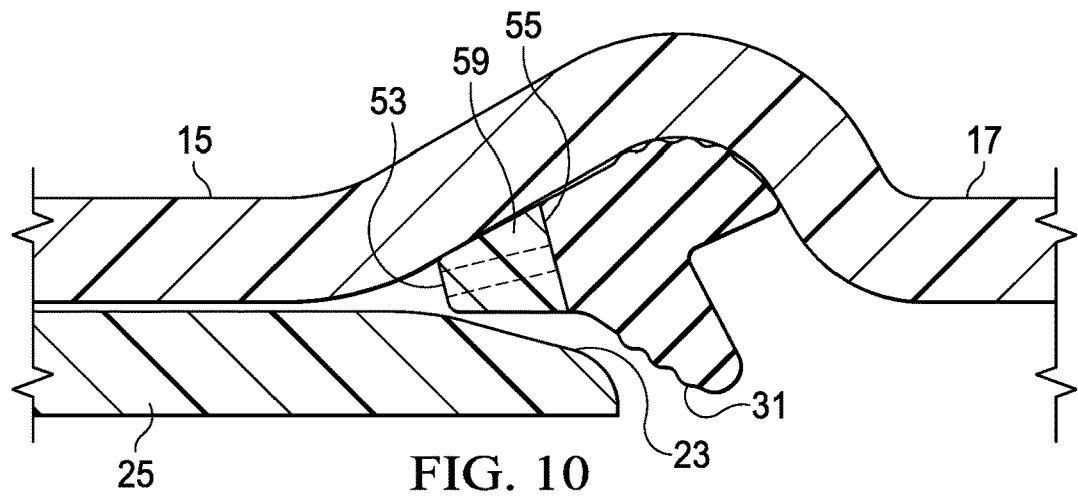
FIG. 10 shows the beginning step of the make-up of a pipe joint with the male pipe end just beginning to make contact with the sealing gasket of FIG. 8.
Figure 9:
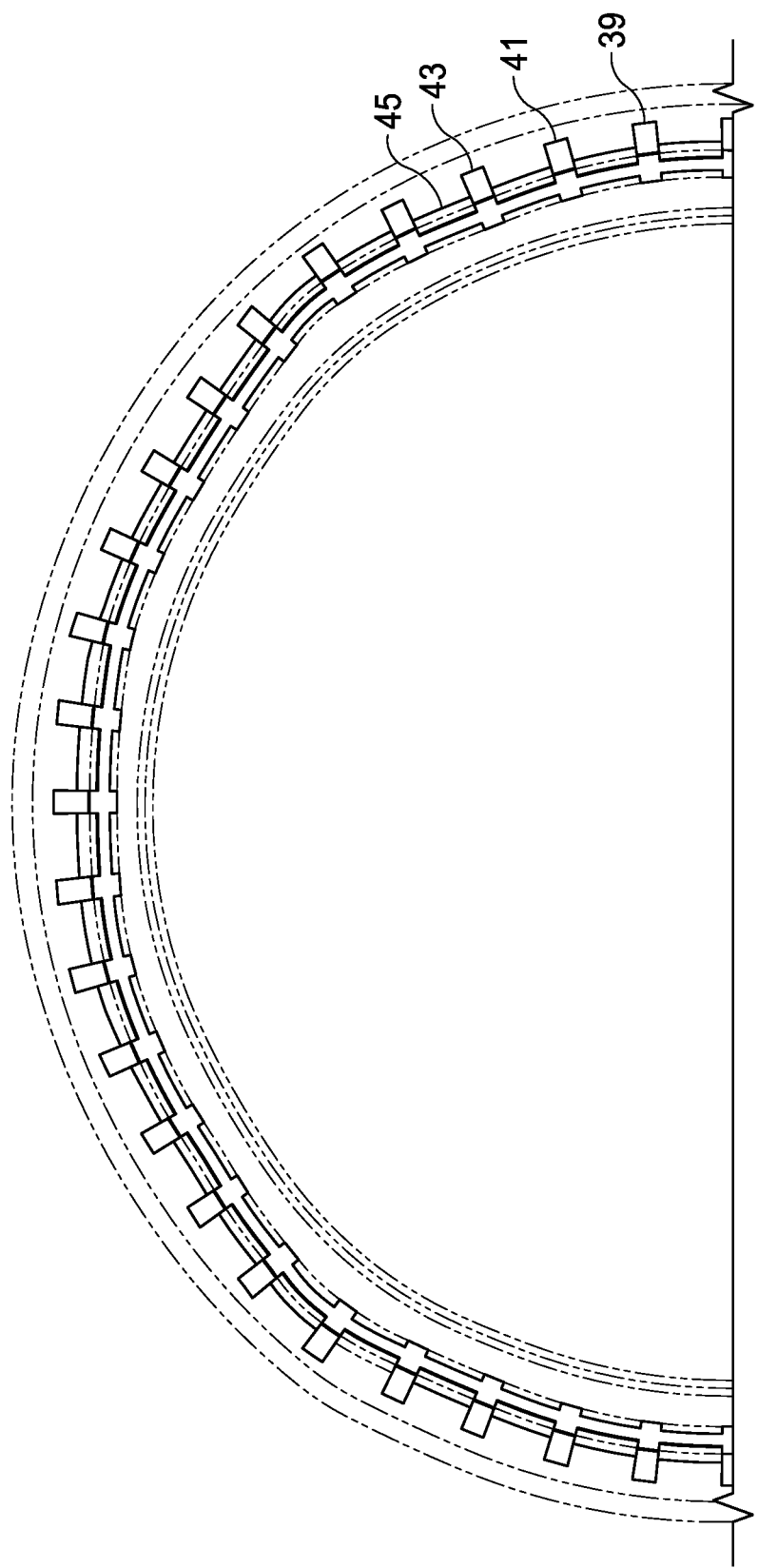
FIG. 9 is a top view of a portion of the gasket of FIG. 8, showing the placement f the hard plastic band, the rubber portion of the gasket body being shown in phantom lines.

FIGS. 13-22 show three different versions of the hard plastic band which are used to reinforce the sealing gaskets of the invention. With reference back to FIG. 8, the earlier version of the hard plastic band had the interconnecting band or ribbon running along the entire length of the wedges, in other words, along the entire side edges 57, 59 in FIG. 8. However, as best seen in FIG. 10, the front edges 53 of each wedge was exposed after manufacture so that the hard plastic band as a whole was not "interlocked" within the rubber of the gasket body. As a result, it had a tendency to slip out of the gasket body at the front edge regions (53 in FIG. 8) of the spaced wedges. The region where no rubber was present was that region indicated generally at 53 in FIG. 8 and also at 53 in FIG. 10.

It has been found that the deficiencies of the earlier version of the gasket can overcome by extending the geometry of the rubber at the nose of the gasket and in front of the plastic band insert so that the insert front edge is completely covered by rubber. In other words, enough rubber is put around the plastic insert to ensure that it can't be detached from the rubber of the gasket body. In this sense, it is "interlocked" within the rubber gasket body. Most preferably, the band or ribbon portion of the insert (that portion shown as 79 in FIG. 13) is completely surrounded by rubber, except where it attaches to the wedge segments 63, 65, on the rear faces of the segments. The improved plastic band inserts of the invention also have improved geometries which achieve a better interlocked condition with respect to the rubber gasket body and which can be more easily injection molded in some cases.

Figure 13:
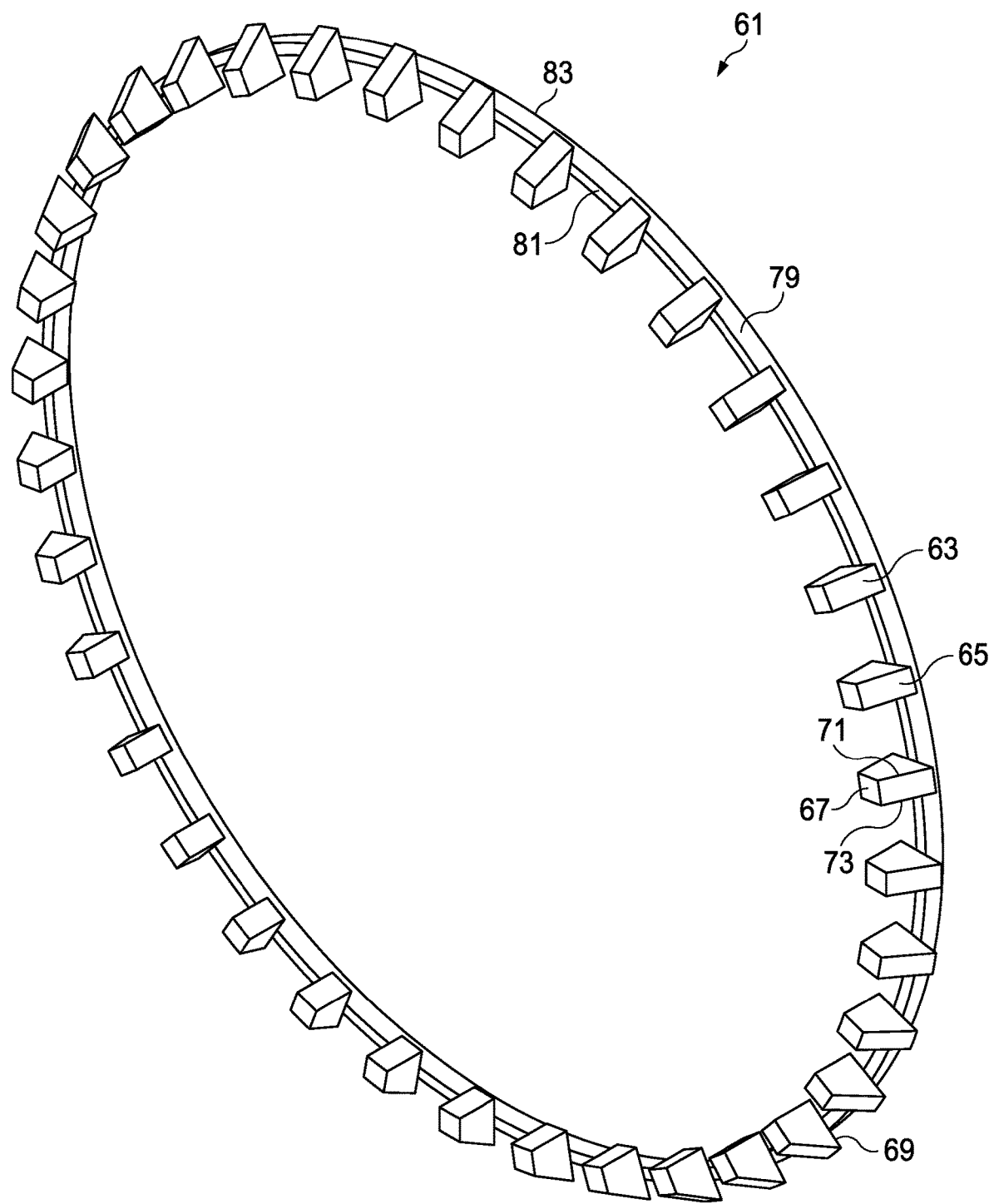
FIG. 13 is another version of the hard plastic ring used as the reinforcing element in the gasket of the invention where the hard plastic ring is located behind the spaced wedges so that a rear edge of each of the spaced wedges is supported on the continuous band.

With further reference to FIG. 13 of the drawings, there is shown one version of the improved hard plastic band used in the sealing gaskets of the invention. Once again, the pipe sealing gasket is designed for receipt within a raceway provided within a female bell socket end of a thermoplastic pipe, the raceway being generally arcuate with a forward facing slope region when viewed in cross section, as previously described. The raceway has been previously formed during the manufacture of the pipe and the gasket is installed thereafter.

Figure 14:
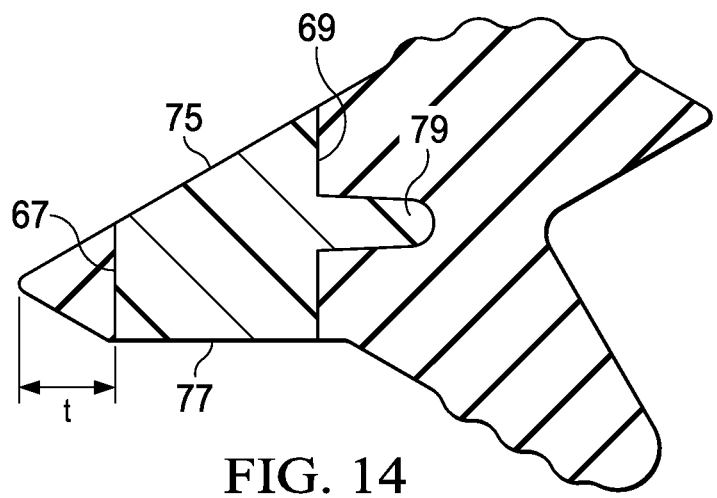
FIG. 14 is a side, cross sectional view of the improved gasket of the invention using the reinforcing ring of FIG. 13.
Figure 15:
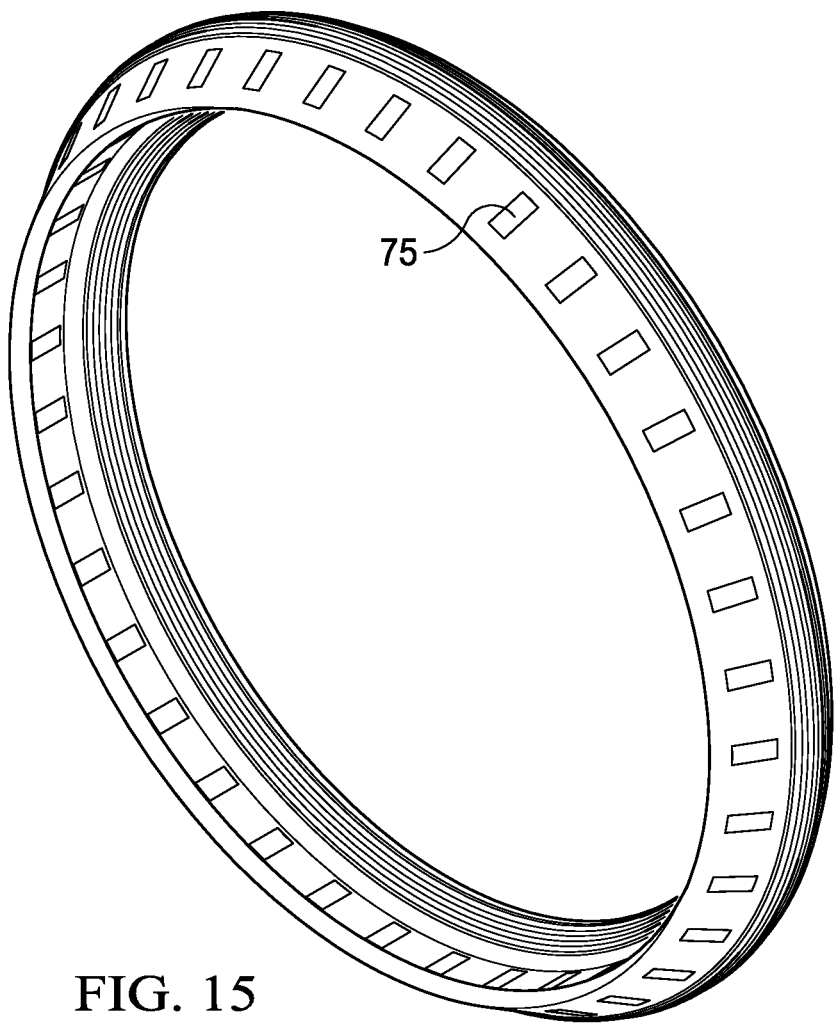
FIG. 15 is a perspective view of the version of the gasket of the invention using the reinforcing ring of FIG. 13.
Figure 16:
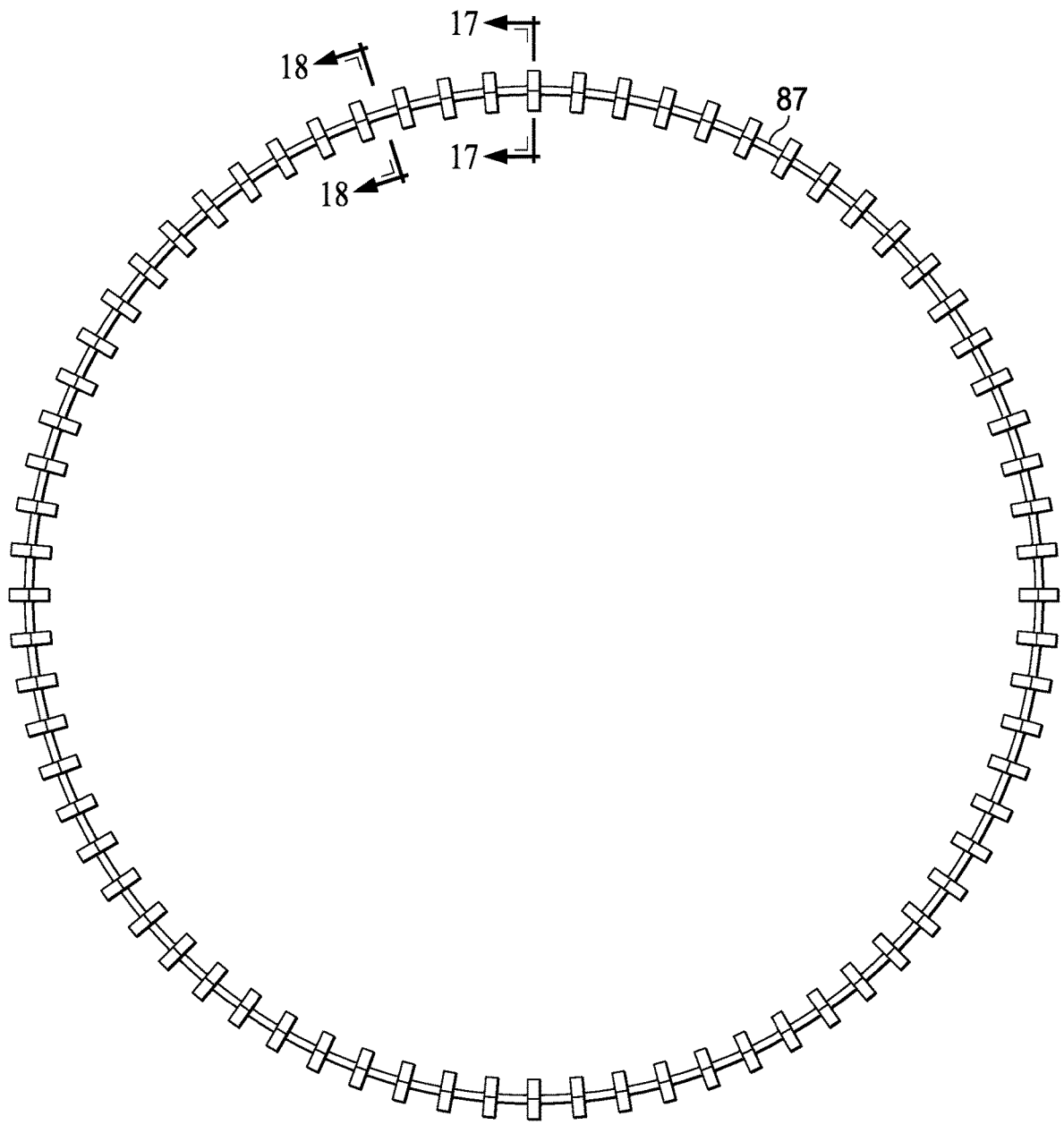
FIG. 16 is a top, plan view of another version of the reinforcing ring used in the gaskets of the invention with the interconnecting band or ribbon being located approximately half way in and approximately half way behind the associated wedges.
Figure 17:
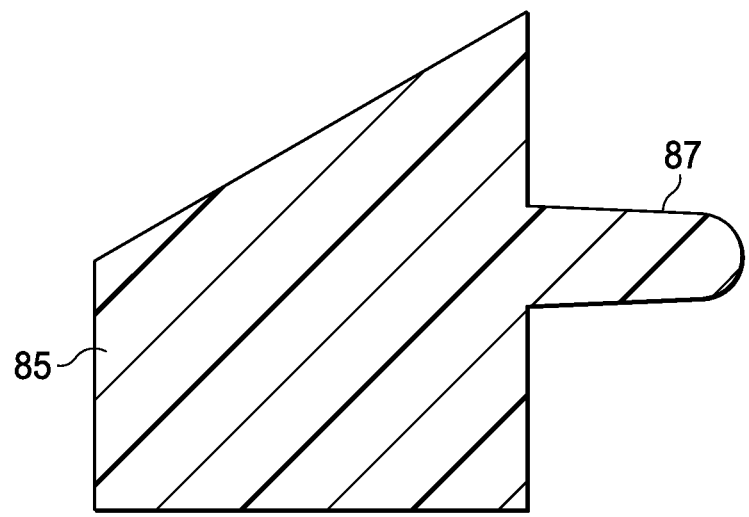
FIG. 17 is a side, cross sectional view taken along lines A-A in FIG. 16.

The leading nose region of the main body portion of the gasket is once again reinforced by a hard plastic band formed as a series of integral, spaced wedges interconnected by a flexible ribbon, the hard plastic band being embedded within the leading nose region of the main body portion of the gasket during gasket manufacture. As shown in FIGS. 13 and 14, each of the spaced wedges 63, 65, has a front edge 67, a rear edge 69, opposing side edges 71, 73, and top and bottom edges 75, 77. It will be appreciated from FIG. 13 that the opposing side edges 71, 73, slope evenly in the direction of the leading nose region of the gasket when the band is embedded in the rubber gasket body. In this case, however, unlike the band of FIG. 8, the front edges (67 in FIG. 14) of the spaced wedges are covered by a layer of rubber during manufacture so that they are entirely encapsulated in the rubber of the gasket body. Note the thickness of the rubber region "t" in FIG. 14. Thus, while the top and bottom edges 75, 77, or a selected one of the two edges, of the hard band shown in FIG. 14 may be exposed, the front edge 67 of each of the wedges is covered by the thickness of rubber indicated as "t" in FIG. 14. This extra layer of rubber keeps the wedges firmly embedded in the rubber of the gasket in use.

In the case of the hard plastic band shown in FIG. 13, the band is formed as a continuous ring 79 with an inner sidewall 81 and an outer sidewall 84, and wherein the rear edges 69 of each of the integral, spaced wedges sit flush at one circumferential position on the inner sidewall 81 of the continuous ring. In the version of the band shown in FIG. 13, the wedges are approximately equi-distantly spaced about the band 79. The band or ring 79 in this version of the invention thus extends continuously behind the wedge segments and is completely embedded in the rubber of the gasket body, helping to further interlock the band with respect to the remainder of the gasket body. It also acts like a circumferential runner in the plastic molding operation discussed earlier with respect to FIGS. 3-6. Even if the front edges of the wedge segments were somehow pushed out from the rubber of the gasket body, they will remain "interlocked" by means of the band 79. However, this should not occur under normal operating conditions.

Figure 18:
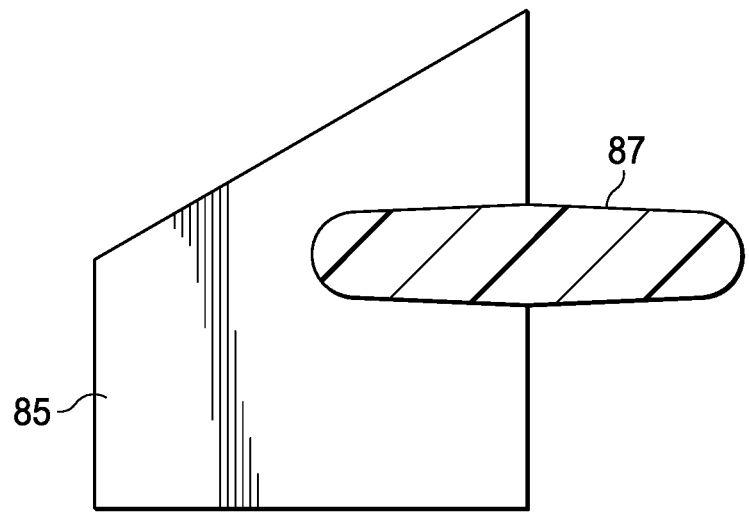
FIG. 18 is a side, cross sectional view taken along lines B-B in FIG. 16.
Figure 19:
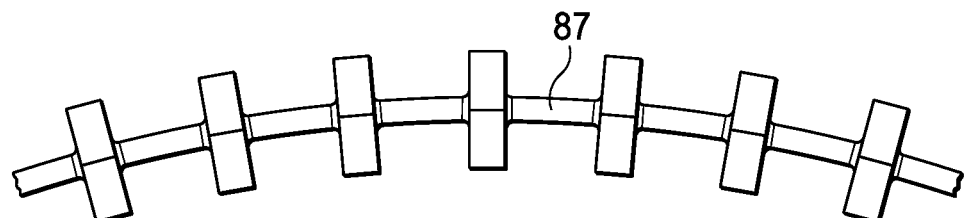
FIG. 19 is an isolated view of a portion of the reinforcing ring of FIG. 16, shown in somewhat enlarged fashion, for ease of illustration.

FIGS. 16-19 show another version of the improved hard plastic band 87 of the invention. In this version of the band, the opposing side edges of each wedge (such as side 85 in FIG. 17) again slope evenly in the direction of the leading nose region of the gasket once the band is installed during manufacture. The band 87 is not continuous, as shown in FIG. 19, but rather interconnects the series of wedge segments. As will be best appreciated from FIG. 18, the plastic and 87 in this case is positioned approximately half in back of each wedge and half in the middle region of each wedge. In other words, one half of the body length of the band 87, as viewed in the section in FIG. 18, is embedded in the body of the wedge. One half of the body length of the band 87 is exposed. This arrangement makes the structural connection between the band and wedge segments stronger and makes it more difficult for the front edges of the wedge segments to be pushed out of the rubber gasket body so that they somehow become exposed.

Figure 20:
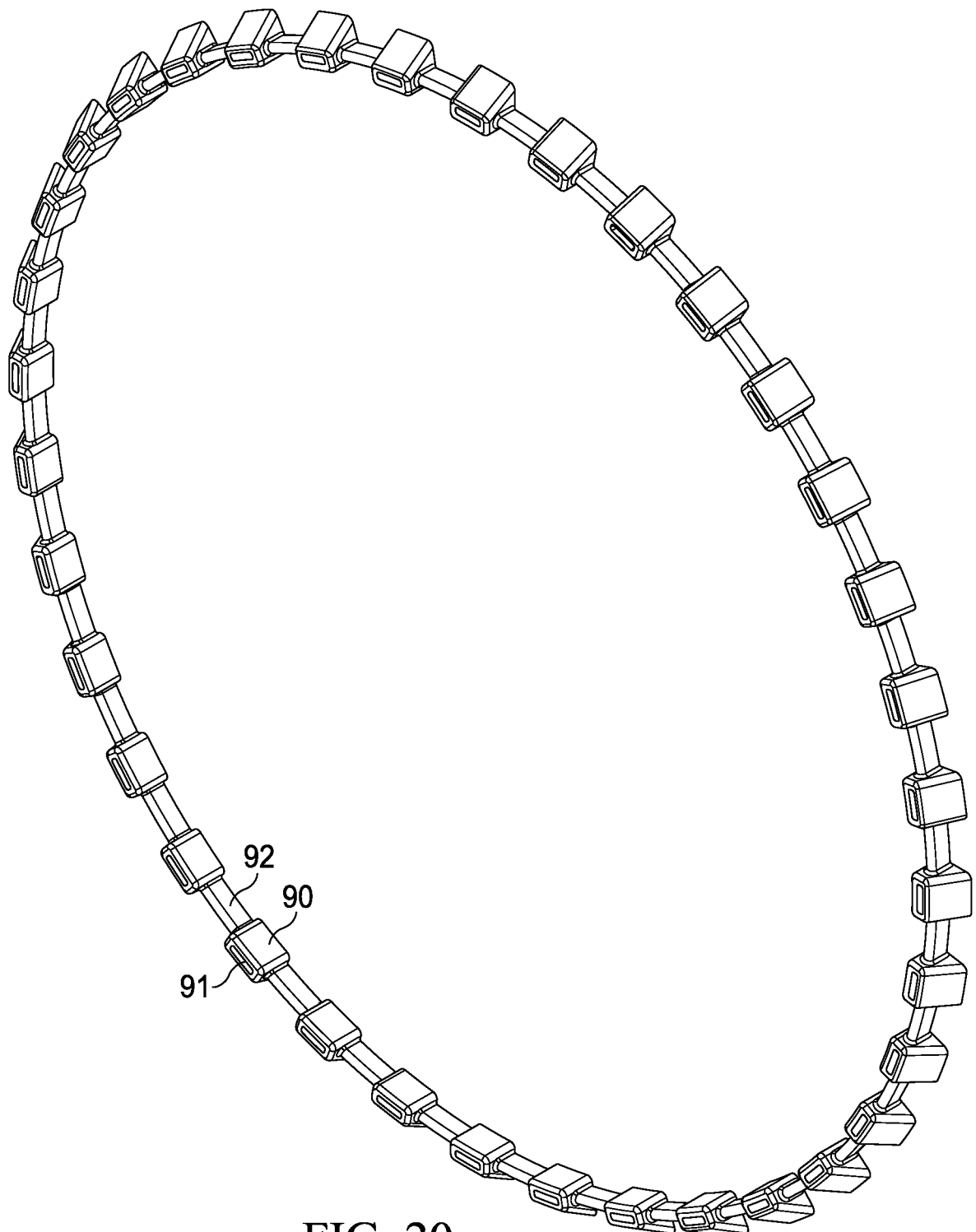
FIG. 20 is a perspective view of yet another reinforcing ring used in the improved gaskets of the invention, showing the hollow wedge segments used in the ring.
Figure 21:
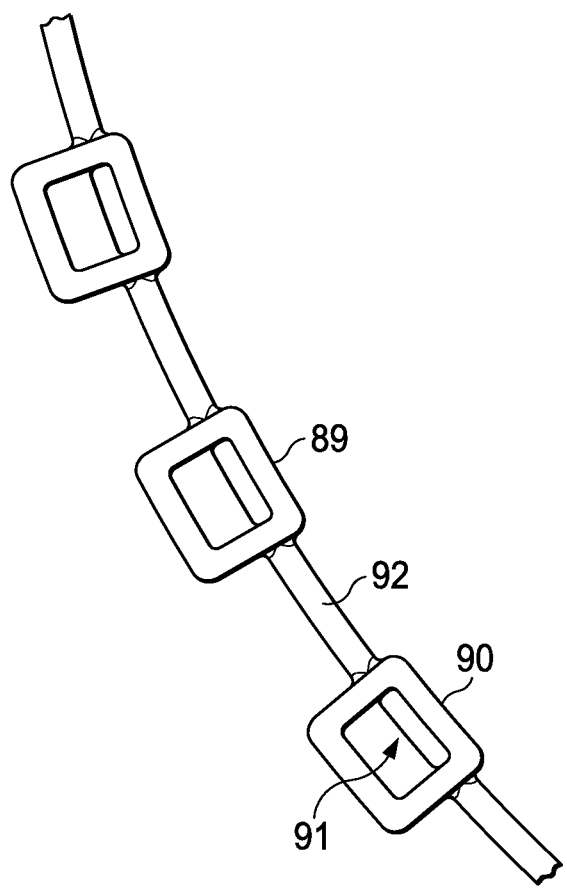
FIG. 21 is an isolated view of a portion of the reinforcing ring of FIG. 20 showing the hollow segments thereof in greater detail.
Figure 22:
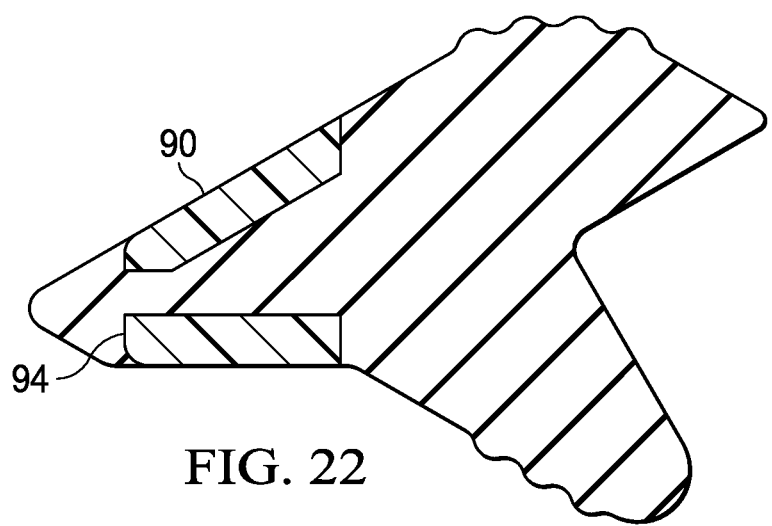
FIG. 22 is a side, cross sectional view of the version of the gasket of the invention using the reinforcing ring of FIG. 20.

FIGS. 20-22 show yet another version of the hard plastic band used in the sealing gaskets of the invention. The band 92 again has a series of wedges 89, 90, which are positioned at equi-distantly spaced locations about the circumference of the band 92. As described with respect to the wedge of FIG. 14, the wedges again have front, rear and opposing side edges and top and bottom edges with the side edges sloping evenly in the direction of the leading nose region of the gasket as viewed in section in FIG. 22. As shown in FIG. 21, the opposing side edges of each wedge (89, 90) are intersected by the band 92 at a location slightly behind the middle region of each wedge. Also, in this case, at least selected ones each of the wedges 90 on the hard plastic band 92 has a hollow region 91 formed therein. The hollow recesses pass entirely through each of the wedge segments, communicating the front side and rear sides thereof. Preferably, all of the wedges in this version of the band are hollow.

Once again, as in the version of the band described in FIG. 14, the front edges 94 of the hollow wedge segments 90 are covered by a layer of rubber so that they are encapsulated within the rubber of the gasket body (see FIG. 22). The hollow segment version of the invention offers a better solution for mold flow problems since it offers more of a uniform thickness of rubber through the entire geometry of the wedge, although splitting around the holes making up the hollows of the wedges. This design generally offers the best connection between the rubber and hard plastic inserts with better interlocking with the rubber. Note, for example, the difference in the location of the surrounding rubber in the cross sectional view of FIGS. 22 and 14. There is a wider contact surface between the wedges segments and the pipe that reduces marks from cyclic pressure loads in use. The hollow regions allow more rubber through and around the band for better interlocking. Less material is used on the band, since it is in a sense discontinuous. As will be appreciated from FIG. 21, the hollow band offers a strong "closed frame" wedge segment structure. The "hollow" passages through the wedge insert geometry allowing rubber to flow to split, go through and then join at the front edges of the inserts. The parts are interlocked so no bonding or glues are required between rubber and plastic.

An invention has been provided with several advantages. The method for installing a gasket of the invention allows a pipe gasket to be installed within a preexisting and preformed groove in a thermoplastic pipe. Once the gasket has been secured in position in snap-fit fashion, it is securely retained within the pipe raceway and resists axial forces tending to displace the gasket from the raceway. Because a gasket is inserted within a preformed pipe groove or raceway, the manufacturing and installation processes are simplified and made less costly. The design of the gasket also makes it possible to remove one gasket and reinstall another within a preformed raceway in the selected pipe end.

The gasket which is utilized in the process is simple in design and relatively economical to manufacture. There is no need for an external retaining band or an internal metal ring to assist in securing the gasket within the pipe groove. Because the metal retaining band or ring are not necessary, it is also possible to eliminate the pins necessary to hold the band or ring in place inside the mold during manufacture, as in the previous Reiber gasket art. The hard plastic band with its integral, spaced wedges acts to prevent extrusion of the gasket from the female pipe groove under a variety of fluid pressure situations, or from being displaced during field assembly. Providing the wedges as an integral part of a continuous ribbon simplifies the manufacturing process and saves time. The wedge segments provide high radial stiffness for solid support of the gasket which acts to prevent extrusion under pressurized conditions.

While the invention has been shown in several of its forms, it is not thus limited but is susceptible to various changes and modifications without departing from the spirit thereof.

What is claimed is:

1. A pipe sealing gasket received within a raceway provided within a female bell socket end of a thermoplastic pipe, the raceway being generally arcuate with a forward facing slope region when viewed in cross section, and wherein the raceway has been previously formed during the manufacture of the pipe and the gasket is installed thereafter, the female bell socket end having a given internal diameter which is being designed to receive a mating male thermoplastic pipe end to form a pipe joint, the male thermoplastic pipe end having a given outer diameter, the gasket comprising:

a ring shaped elastomeric body having a main body portion formed of rubber which, when viewed in cross section, includes a leading nose region, a lower compression region and a trailing tail region, the leading nose region facing generally towards the female bell socket end of the pipe once the gasket is inserted within the pipe;

wherein the leading nose region of the main body portion of the gasket is reinforced by a hard plastic band having a series of spaced wedges integrated with the band at equi-distantly spaced locations about the circumference of the band, the hard plastic band being embedded within the leading nose region of the main body portion of the gasket during gasket manufacture, each of the wedges having a front edge, a rear edge and opposing side edges, as viewed in cross section, the wedges intersecting the hard plastic band at spaced locations, the wedges on the hard plastic band each having a hollow region which communicates the front and rear edges thereof, whereby rubber can flow through and fill the hollow regions during manufacture of the gasket, the front edges of the wedges being covered by a layer of rubber during manufacture so that they are entirely encapsulated in the rubber of the gasket body;

wherein the main body portion of the gasket has a given durometer hardness and wherein the hard plastic band is formed of a synthetic plastic material having a durometer hardness which is greater than the durometer hardness of the main body portion of the gasket while being flexible enough to allow the gasket to accept inverse curvature during installation into the groove provided in the female bell socket end of the thermoplastic pipe; and wherein the wedges on the hard plastic band act in concert with the forward facing slope region of the arcuate raceway to wedge between the outer diameter of the male thermoplastic pipe end and the internal diameter of the female bell socket end, the embedded hard plastic band acting to prevent extrusion of the gasket from the groove provided in the female bell socket end of the thermoplastic pipe once the male thermoplastic pipe end is installed to form a pipe joint.

2. The sealing gasket of claim 1, wherein the main body portion of the gasket is formed of a natural or synthetic rubber.

3. The sealing gasket of claim 2, wherein the main body portion of the gasket is formed of a rubber selected from the group consisting of styrene butadiene rubber, ethylene propylene diene monomer rubber and nitrile rubber.

4. The sealing gasket of claim 2, wherein the synthetic plastic material is an engineered plastic.

5. The sealing gasket of claim 4, wherein the synthetic plastic material is a modified polyphenylene ether.

6. The sealing gasket of claim 2, wherein the lower compression region of the gasket includes a series of circumferential engagement grooves for engaging the mating male thermoplastic pipe end.

7. The scaling gasket of claim 6, wherein the main gasket body has an outer bulbous region which is also provided with a series of circumferential engagement grooves for engaging the female bell socket end of the pipe.

* * * * *